April 19, 1966  F. BROUWER  3,246,548
CONTOUR LATHE CONTROL
Filed Sept. 15, 1964
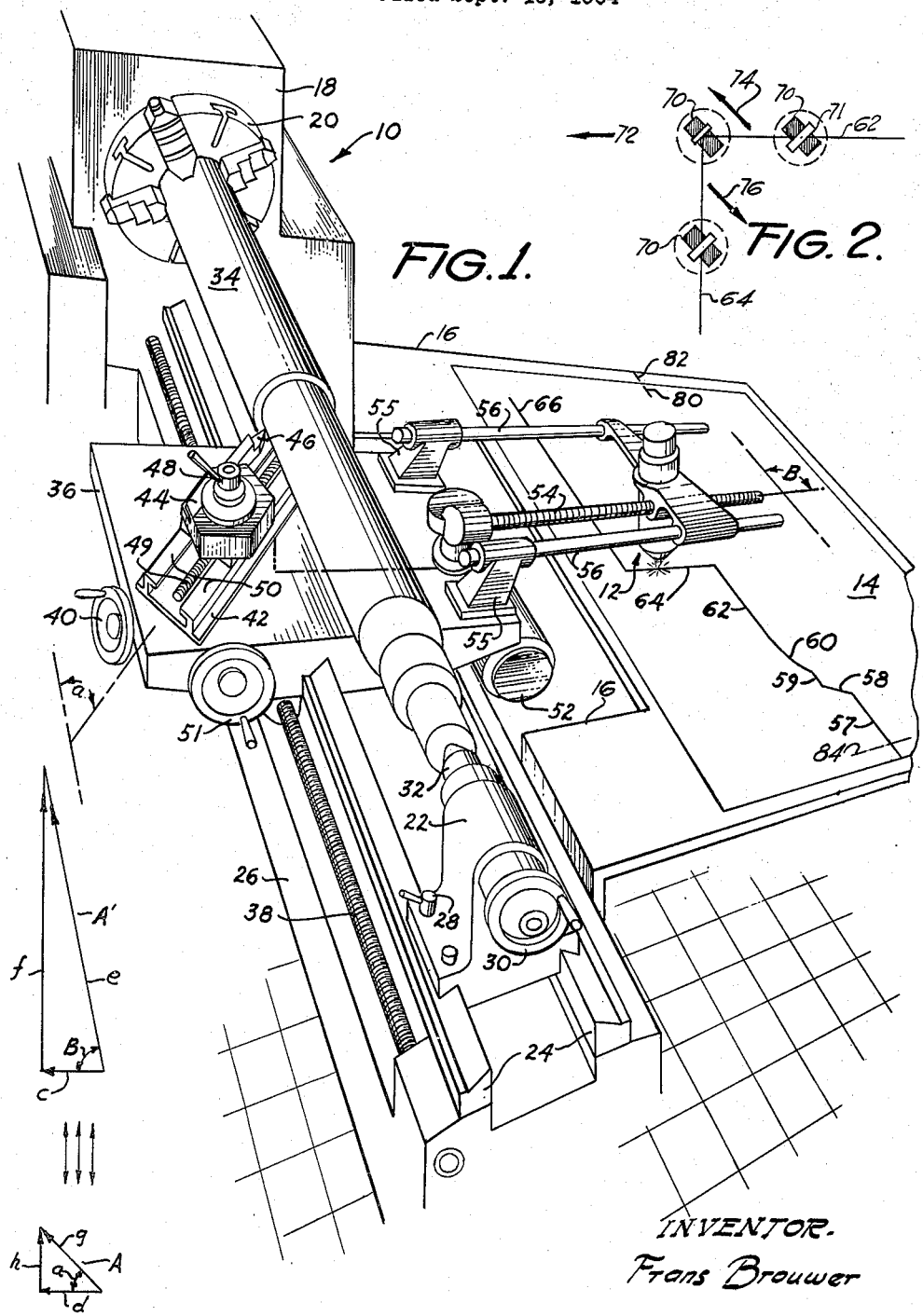
INVENTOR.
Frans Brouwer
By Norton Lesser
Attorney United States Patent Office 3,246,548
Patented Apr. 19, 1966

3,246,548
CONTOUR LATHE CONTROL
Frans Brouwer, Glencoe, Ill., assignor to Stewart-Warner Corporation, Chicago, Ill., a corporation of Virginia
Filed Sept. 15, 1964, Ser. No. 396,668
13 Claims. (Cl. 82—14)

This invention relates in general to automatically controlled machine tools and more particularly to an arrangement for automatically controlling a lathe to follow a magnified drawing or template of a part to be reproduced from the drawing.

In recent years automatic control of machine tools has been facilitated by the use of a scanning arrangement incoporating a sensing element which follows a pattern or profile drawing of the finished part while the associated cutting apparatus or tool is caused to follow the sensing element. The tool, therefore, cuts or forms the workpiece to a desired dimension corresponding to the drawing. The sensing element of the scanning arrangement or apparatus usually comprises a photosensitive assembly, which follows a drawing, or it may comprise a hydraulic finger, for example, which edge traces a template. The scanning arrangement in turn transmits its movements through appropriate servo-mechanisms to the cutting tool.

In the case of machine tools such as lathes such automatic control is usually effectuated through a pattern having the same scale or magnification as the finished part or, in other words, a one to one ratio. These lathes generally known as tracer lathes may utilize a tracing finger for following the pattern cut in a template to control both its own movement and movement of the tool in a direction transverse to the longitudinal axis of the lathe, while both the tool and tracing finger are automatically carried along the lathe bed by the lead screw.

One of the problems attendant in the use of templates or patterns having the same scale as the finished part is that any errors in the pattern are reproduced in the finished part in the same ratio. It is therefore desirable to enlarge or magnify the pattern relative the finished part so that any inaccuracies therein may be substantially reduced in the finished part. Even in the general class of machine tools this has necessitated either multiple slides or multiple servomechanisms for driving the sensing element and tool at respective ratios and has apparently not even been attempted in automatic control of lathes since such arrangements are both complex and expensive.

In order to avoid this complexity and provide a more simplified and economical approach utilizing a magnified drawing or template for controlling a lathe, the present invention incorporates an arrangement whereby the scanning element and tool are moved along respective lines transverse to the lathe axis for enabling a single servomechanism coupling both the scanning element and tool to reduce the movement of the tool relative to the scanning element and thereby permit the use of a magnified pattern of the finished workpiece to control the lathe.

One object of the present invention, therefore, is to provide an improved arrangement for controlling a lathe to automatically cut a workpiece in conformance with a drawing or template which is enlarged relative to the finished work in only one axis direction.

Another object of the present invention is to provide an improved method for cutting stock guided by a line drawing.

Another object of the present invention is to provide an improved arrangement for controlling a lathe to automatically cut a workpiece.

Other objects and features of the present invention will become apparent on examination of the following specification and claims, together with the drawings wherein:

FIG. 1 is a largely schematic perspective of a lathe and photosensitive scanning assembly incorporating the principles of the present invention;

FIG. 2 is a schematic illustration of the manner in which the photosensitive assembly follows the line tracing; and FIG. 3 is a vector diagram of the relative velocity components of the photosensitive assembly and the tool.

In FIG. 1 a lathe is indicated by the reference character 10 and it is adapted to be controlled by a scanning arrangement or photosensitive assembly 12. The assembly 12 in turn is adapted to be controlled from a line drawing 14 supported on a bracket 16 fixed to the lathe 10.

The lathe 10 comprises a conventional headstock 18 having a rotatable chuck 20 and a tailstock 22 slidable on rails 24 of a lathe bed 26. The tailstock 22 is adapted to be locked in position on the rails by means of a locking post 28 and a hand wheel 30 is provided for adjustably positioning a tailstock spindle 32 in the tailstock for supporting one end of a workpiece 34. The other end of the workpiece 34 is supported in the chuck 20 which also serves to rotate the workpiece when the lathe 10 is operated.

A carriage 36 is adapted to be reciprocably movable along the rails 24 between the tailstock 22 and the headstock 18 in a conventional manner either by automatically operating a lead screw 38 to drive the carriage 36 in one direction or by manual operation of a handwheel 40. For the purpose of this application the lead screw 38 normally drives the carriage 36 to the left as seen in FIG. 1 when the lathe is in automatic operation. The carriage 36 carries a tool post slide 42 which in turn carries a tool post 44 in which a cutting tool 46 is clamped by a locking post 48. The tool post slide 42 instead of being conventionally mounted for movement on the carriage 36 both perpendicular to the axis of the workpiece 34 and parallel to that axis, is arranged in any well known manner so that the tool post 44 and tool 46 are adapted to be moved by a lead screw 49 along a pair of rails 50 on slide 42 at an angle $a$ to the axis of the workpiece 34. The purpose of the angle $a$ will be more explicitly explained hereinafter. The tool post 44 and tool 46 are adapted to be moved along the lead screw 49 either manually by means of a handwheel 51 or automatically by means of a servomotor 52.

The servomotor 52 is supported on the carriage 36 and in addition to moving tool 46 along screw 49, it is adapted to also traverse the photosensitive assembly 12 along a lead screw 54. The photosensitive assembly 12 is also supported from the carriage 36 by means of spaced apart standards 55 and cantilever beams 56 for movement towards or away from the axis of the workpiece as the photosensitive assembly follows the drawing 14 located on the table 12. The lead screw 54 and beams 56 are arranged at an angle B to the axis of the workpiece and the purpose of this angle will be more explicitly set forth hereinafter.

The drawing 14 comprises a line tracing of the contour of the desired part to be finished from workpiece 34 although edge tracing or other template arrangements, together with hydraulic or other servomechanisms, may be used. The position of the various cuts on the workpiece 34 are indicated by tandemly connected lines 57, 58, 59, 60, 62, 64 and 66 on the drawing 14. The longitudinal dimension of each cut along the axis of the workpiece is drawn to scale while the length of the cut in a direction perpendicular to the axis of the workpiece is drawn at a scale providing a desired degree of magnification with respect to the actual depth of the cut and may, for example, be at a scale of 10 to 1 or at other desired relationships. Thus, the cut corresponding to line 57 is initiated adjacent the tailstock end of the workpiece 34 and proceeds parallel to the axis while the cut corresponding to line 58 occurs at a transverse angle to the axis of the workpiece 34 and the cut corresponding to line 60 describes a non-linear curve. The cuts governed by lines 57, 62 and 66 simply occur longitudinally of the workpiece and parallel to the axis of the workpiece. The cut corresponding to line 64 is taken perpendicular to the axis of the workpiece 34. Thus the drawing 14 simulates a substantial proportion of the forms of cuts which may be taken along a workpiece by the lathe tool 46 including angular, curved, perpendicular and longitudinal cuts.

The photosensitive assembly 12, for example, is of an error sensing type such as disclosed in Patent No. 3,124,691 granted to Brouwer on Mar. 10, 1964. The assembly 12 has a photocell indicated at 70 in FIG. 2 and the photocell assembly is intended to continuously scan substantially transverse to the lines 57–66 with small scale oscillatory movements. In this case the photocell 70 instead of being arranged perpendicular to the scanned line is preferably oriented at, for example, 45° to the scanned line, and the orientation of the associated mask 71 is altered correspondingly. The photocell with appropriate circuitry such as the type described in said Brouwer patent, provides a signal whose phase and amplitude are indicative respectively of the direction and magnitude of deviation of the center of scan from the segment of line being traced. The operation of the motor 52 in turn is speed and direction controlled by the magnitude and phase variable signal provided by the photocell 70. Motor 52 instead of rotating the photocell assembly 12 as described in said Brouwer patent, is adapted in any well known manner to drive the photocell assembly 12 along the lead screw 54.

Thus, if the photocell 70 is sensing line 62, for example, as shown in FIG. 2, while the carriage 36 and assembly 12 are driven in the direction indicated by arrow 72, and the center of scan of the assembly 12 is directly over the line 62, the motor 52 receives no signal. The photocell 70 is therefore driven solely by the lead screw 38. If the center of scan of the photosensitive assembly deviates to the left of line 62 as viewed in FIG. 1, a signal representative thereof is supplied to the motor 52 to drive it in a direction along lead screw 54 represented by arrow 74 (FIG. 2) to restore it to its centered position. On the other hand, the motor 52 receives a signal to drive the assembly 12 in the direction of arrow 76 along lead screw 54 when the assembly 12 deviates to the right of line 62 as viewed in FIG. 1.

When the photocell 70 reaches the junction of lines 62 and 64, it continues a slight movement beyond the junction. The phase shift that is now sensed occurs in a direction corresponding to arrow 74, and, therefore, the servomotor 52 now drives photosensitive assembly 12 in the direction of arrow 76 to scan line 64. Since the lead screw 38 is tending to drive the photosensitive assembly 12 to the left, a phase shift corresponding to the direction of arrow 74 will continue to be detected and the motor 52 will continue to drive the photosensitive assembly in a direction corresponding to arrow 76 so that it scans line 64.

Scanning along lines 57, 59 and 66 is similar to that explained for line 62 with the junction of each line with another being sensed as indicated above and the photocell 70 driven in an appropriate direction by motor 52. Scanning along lines 58 and 60 will be similar to scanning of line 64 except that movement in the direction of the arrow 76 is not as continuous or as uninterrupted as in the case of line 64, since the angle of line 58 and the curve of line 60 with respect to axis of the workpiece are far more gradual than line 64.

Since movements along the lathe bed are continuous and since many of the cuts are to be made either directly perpendicular or at an angle to the axis of the workpiece 34, the lead screw 49 and tool 46 are mounted at an angle to the axis of the workpiece 34. The tool 46 may therefore cut in a direction transverse or perpendicular to the workpiece axis as it moves continuously along the workpiece 34. This necessitates that the tool 46 be moved transverse to the axis of the workpiece 34 at a rate which enables it to maintain a desired relationship with the workpiece as the carriage 36 moves to the left. Likewise, since the photocell 70 must be moved transverse to the axis of the workpiece as the carriage 36 moves to the left, it, too, must be moved along an angle with respect to the axis of the workpiece.

In addition the photocell 70 must move towards the axis of the workpiece when scanning a line such as 64 at a rate which depends on the ratio between the dimensions of the line transverse to the axis of the workpiece and the corresponding cut of the workpiece or the magnification of the system. Thus, for purposes of accuracy in reproduction, the dimensions of the drawing 14 in a direction perpendicular to the axis of the workpiece, otherwise called the transverse dimensions, are made many times larger than the actual dimension to which the workpiece is to be cut. Since the drawing will normally have approximately the same inaccuracies whether drawn larger than scale or not, the transverse dimensions of the drawing are made at a scale of 10 to 1 with respect to the finished workpiece so that the relative error is greatly reduced. These transverse dimensions are transferred to the workpiece through a gear reduction system connecting the motor 52 to the lead screw 49 so that the workpiece is cut to the desired dimension with the inaccuracies being reduced by a corresponding factor of 10 to 1 or by the magnification of the system.

In FIG. 3, velocity vector diagrams of the movements of the tool 46 and the photocell 70 during automatic lathe operation are illustrated at A and A' respectively. Both the photocell and tool have an identical velocity component as they are carried to the left along the axis of the workpiece at the same rate by lead screw 38 as indicated at $c$ and $d$ respectively. The cell 70 also has a velocity component $e$ along its lead screw 54 at an angle B with respect to the velocity component $c$ along axis of the workpiece. The resultant $f$ of components $e$ and $c$ represents the path travelled by the photocell in scanning the drawing 14 over any particular interval.

The tool 46 in the meantime has a velocity component $g$ along its lead screw 49 with the resultant of the velocity components $g$ and $d$ being $h$ and representing the cut taken by the tool 46 in a direction transverse to the axis of the workpiece. If the transverse dimension of the cut in the workpiece is only $1/10$, for example, as long as the corresponding dimension of the drawing 14, the resultant $h$ must be only $1/10$ the value of the resultant $f$. Thus, the relationship between $f$ and $h$ or $f/h$ must correspond to the desired degree of magnification between the transverse dimensions of the drawing and the transverse dimensions of the cut.

Since $h/d = \tan a$ and $f/c = \tan B$ and since $c = d$; $h/f = \tan a/\tan B$. Therefore the angle B at which the lead screw 54 is set with respect to the axis of the workpiece and the angle $a$ at which the lead screw 49 is set with respect to the axis of the workpiece is chosen so that their tangents have a ratio corresponding to the desired relationship between $f$ and $h$ or the ratio between the transverse dimension of the drawing such as the length of line 64 and the depth of the corresponding cut. For purposes of example, if the magnification of the system is ten to one, the angles $a$ and B are chosen so that the tangent of B is ten times as large as the tangent of $a$.

The velocity of movement of the cell 70 along screw 54 is related to the velocity of movement of tool 46 along screw 49 by the value $e/g$ which is equal to $c \cos a/d \cos B$ or $\cos a/\cos B$. This latter value establishes the gearing ratio between the drive applied by motor 52 to photocell assembly 12 and the drive applied by motor 52 to tool 46 so that for the chosen angles $a$ and B the ratio of the drives is determined by the ratio of the cosines of the angles $a$ and B, and this value is chosen as a rational number to simplify the gearing.

Prior to initiating automatic operation of lathe 10, the tool 46 and the photocell 70 are related to the center line extending between the chuck and tailstock so that their position is known. The drawing 14 is provided with marks such as 80 indicating the axis of the workpiece 34 and these are aligned with corresponding marks such as 82 on the bracket and corresponding to the center line between the chuck 20 and tailstock spindle 32. If desired, the output of photocell 70 may be temporarily connected to a mill meter and the photocell may be operated to scan one of the lines of the drawing with the mill meter providing an indication that the drive is parallel to the axis of the lathe. The tool 46 and photocell assembly 12 may then be moved to the right of the workpiece 34 by operation of wheel 40. The hand wheel 51 is controlled in any well known manner to bring the cell 70 into relationship with an extension of the line 57 beyond the tailstock end of the workpiece as indicated by dashed line 84 on the drawing 14 while moving tool 46 into a corresponding position. This position will be any arbitrary distance to the right of the workpiece so that when the workpiece 34 is chucked and the lathe 10 is automatically operated, photocell 70 causes the tool 46 to follow the line 57 and encounter the workpiece 34 at the proper position. The tool 46 and cell 70 will both move to the left in synchronism, under control of lead screw 38 and cause tool 46 to initiate cutting of the workpiece to the diameter corresponding to line 57. It will be understood of course that if necessary the length of the workpiece may be made longer than necessary to permit trimming, if desirable. An alteration procedure for aligning the drawing, of course, is to take one or more preliminary cuts in the workpiece under control of the drawing and measure the workpiece to ensure it corresponds to the desired dimension, whereafter cutting of the entire workpiece may proceed.

During automatic operation of lathe 10, the cell 70 scans the lines 57, 58, 59, 60, 62, 64 and 66 in sequence, as the carriage 36 simply moves automatically to the left under control of the conventional drive of the lathe 10. When the cell initiates scanning of line 58 the servomotor 52 is caused to drive the cell 70 more consistently towards the axis of the workpiece and to drive the tool 46 from the axis at relative rates corresponding to $\cos a/\cos B$ with B corresponding to the angle of lead screw 54 and $a$ corresponding to the angle of lead screw 49 with respect to the axis of the workpiece. The angles $a$ and B, as before explained, are calculated to provide, for example, ten increments of movement for cell 70 in a direction perpendicular to the workpiece axis for each increment of movement in that direction made by tool 46. Other values may, of course, be chosen and the relationship between the drawing 14 and the finished part correlated accordingly.

After the cell has scanned line 58 it scans line 59 and since this line is parallel to the axis of the workpiece, the tool 46 moves to the left primarily under control of the lead screw 38 to cut the workpiece 34 to a corresponding diameter. Scanning of the curved line 60 proceeds in a manner similar to that for line 58 except that the relative movements along and transverse to the axis of the workpiece of the cell 70 cause the tool 46 to follow a curved contour instead of a straight line. Line 62 is of course scanned in a manner similar to lines 57 and 59 so that the tool cuts the workpiece parallel to the axis and displaced from the axis by a distance corresponding to the line position. Scanning of line 64 by cell 70 after line 62 is scanned results in the tool 46 making a cut along a radial line such as indicated at $e$ in FIG. 3, whereafter line 66 is scanned to initiate operation of tool 46 parallel to the axis of the workpiece and complete the forming of the workpiece 34.

From the foregoing it may be understood that a wide variety of templates and sensing devices may be utilized for accomplishing the desired results. Thus, if desired, a template having a contour corresponding to the desired finished workpiece and followed by a hydraulically actuated finger can be substituted for the line drawing 14 and photosensitive assembly 12. In this case the finger simply controls a hydraulic valve as it moves along the contour of the template to control its own movement and movement of the tool transverse to the axis accordingly. The valve controls a hydraulic motor or differential cylinder to provide the chosen relative rates of movement between the finger and the tool along respective directions set at angles chosen in accordance with the aforedescribed considerations.

The above constitutes a description of an improved arrangement for automatically operating a machine tool having a cutting tool adapted to be operated in two directions by only controlling movement in one direction and whose inventive concepts are believed more fully set forth in the accompanying claims.

What is claimed is:

1. For use with a machine tool of the type wherein a tool and a sensing element are adapted to be automatically moved in one direction at a constant speed to permit said tool to form a workpiece to a desired dimension in a direction transverse to said one direction while said sensing element detects the outline of a pattern conforming to the workpiece in finished condition and having dimensions in said transverse direction in excess of said desired dimension of said workpiece for controlling the movement of said tool in said transverse direction, the improvement comprising a single servomechanism adapted to drive said tool and said sensing element in respective directions transverse to said one direction with said respective directions corresponding to the ratio between said transverse dimensions and at respective rates individual to said respective directions in response to said sensing element detecting a portion of said outline extending in a transverse direction.

2. The arrangement claimed in claim 1 in which said respective directions each form a respective angle transverse to said one direction whose tangents have a ratio corresponding exactly to the ratio between the transverse dimensions of said pattern and said finished workpiece.

3. The arrangement claimed in claim 2 in which said rates correspond to the ratio of the cosines of said angles.

4. The arrangement claimed in claim 1 in which said rates have a rational ratio.

5. For use with a machine tool of the type wherein a tool and a sensing element are adapted to be carried automatically in one direction at a constant speed to permit said tool to form a workpiece to a desired dimension and pattern in a direction transverse to said one direction while said sensing element detects the outline of a pattern conforming to the workpiece in finished condition with said outline being enlarged in said transverse direction over the desired dimension of said workpiece, the improvement comprising means for enabling said tool and sensing element to be driven along respective paths with said paths each describing a respective angle to said one direction and having tangents related to each other as the ratio between said transverse outline dimension and said desired dimension, a single servomechanism for both said tool and said sensing element, and means coupling both said tool and sensing element with said servomechanism to enable said mechanism to drive said tool and said sensing element at respective rates corresponding to the ratio between the cosines of said angles whereby said sensing element is adapted to follow said outline in a direction transverse to said one direction while said tool is caused to form said workpiece to a corresponding pattern and desired dimension in a direction transverse to said one direction.

6. An automatic lathe for shaping a workpiece in accordance with a desired pattern comprising means for mounting the workpiece for rotation about its axis, carriage means operable to travel along a path parallel to said axis at a constant velocity, a cutting tool, means mounting said cutting tool on said carriage for travel with respect thereto along a path at an angle $a$ with respect to said axis, means for supporting said pattern adjacent said lathe, means for scanning said pattern and for producing an electric signal responsive to misalignment of the scanning means with respect to said pattern, means mounting said scanning means on said carriage for travel with respect thereto along a path at an angle B with respect to said axis, the ratio $\tan B/\tan a$ being equal to the ratio between the transverse dimensions of said pattern and the respective desired transverse dimensions of said workpiece, and means responsive to said electric signal for simultaneously driving said scanning means and said tool means at respective velocities the ratio of which equals $\cos a/\cos B$.

7. An automatic lathe for shaping a workpiece in accordance with a desired pattern comprising means for mounting the workpiece for rotation about its axis, carriage means operable to travel along a path parallel to said axis at a constant velocity, a cutting tool, means mounting said cutting tool on said carriage for travel with respect thereto along a path at an angle $a$ with respect to said axis, means for supporting said pattern adjacent said lathe, means for scanning said pattern and for producing an electric signal responsive to misalignment of the scanning means with respect to said pattern, and means mounting said scanning means on said carriage for travel with respect thereto along a path at an angle B with respect to said axis, the ratio $\tan B/\tan a$ being equal to the ratio between the transverse dimensions of said pattern and the respective desired transverse dimensions of said workpiece.

8. An automatic lathe for shaping a workpiece in accordance with a desired pattern comprising means for mounting the workpiece for rotation about its axis, carriage means operable to travel along a path parallel to said axis at a constant velocity, a cutting tool, means mounting said cutting tool on said carriage for travel with respect to said carriage along a path at an angle $a$ with respect to said axis, means for scanning said pattern, means mounting said scanning means on said carriage for travel with respect to said carriage along a path at an angle B with respect to said axis, and means controlled by scanning means for simultaneously driving said scanning means and said tool along their respective paths at respective velocities the ratio of which equals $\cos a/\cos B$ for respectively scanning said pattern in a direction transverse to said axis and cutting said workpiece in a direction transverse to said axis, while said carriage is operated parallel to said axis.

9. A machine tool having a carriage adapted to be automatically moved in one direction parallel to the axis of a workpiece rotatably carried by said tool whereby a cutting tool carried by said carriage is adapted to cut said workpiece in a direction parallel to said axis in conformance with a pattern adapted to be scanned by a scanning assembly carried by said carriage, the improvement comprising means mounting said cutting tool on said carriage for travel with respect to said axis along a path having an angle $a$ with respect to said axis to enable said cutting tool to cut said workpiece in a direction transverse to said axis, and means mounting said scanning means on said carriage for travel with respect to said axis along a path at an angle B with respect to said axis to enable said scanning assembly to scan in a direction transverse to the axis of said workpiece, said angles $a$ and B being chosen so that $\tan B/\tan a$ is equal to the desired ratio between the transverse dimension of said pattern and the transverse dimension of said workpiece.

10. For use with a machine of the type having a tool for shaping a workpiece in accordance with a desired pattern while said workpiece is rotated about its axis and wherein said tool is adapted to be moved continuously along a path parallel to said axis at a constant velocity and selectively at an angle $a$ to said axis, while a scanning means is simultaneously adapted to be moved at said velocity along a corresponding parallel path for scanning a drawing corresponding to said desired pattern, the improvement comprising means for moving said scanning means along a chosen path at an angle B with respect to said axis for scanning said drawing in a direction transverse to said axis while being moved along said parallel path, said angles $a$ and B being chosen so that the $\tan B/\tan a$ is equal to the desired ratio between the dimension of said pattern transverse to said axis and the desired dimension of said workpiece transverse to said axis.

11. A method of operating a machine for forming a workpiece to a desired pattern by means of a tool which is adapted to be simultaneously moved in one direction along the axis of said workpiece at one rate and in a second direction transverse to the axis of said workpiece at an angle $a$ with respect to said axis while a scanning arrangement is adapted to scan a drawing of said pattern by movement in said one direction at said one rate and in a last direction transverse to the axis of said workpiece and at an angle B with respect to said axis with the dimensions of said drawing being larger in a direction perpendicular to said axis than the dimensions of said desired pattern in said perpendicular direction, the improvement comprising the steps of selecting said angles $a$ and B so that their tangents are related to each other in the same ratio as the ratio of said dimensions in said perpendicular direction, and the step of operating said tool and scanning arrangement along the respective transverse paths at respective velocities related to each other in a ratio corresponding to the cosines of said angle.

12. A control system for enabling a workpiece to be shaped in accordance with a desired pattern by a cutting tool operable to travel along a path parallel to the axis of said workpiece at a constant velocity while said workpiece is rotated about its axis and said pattern is scanned by scanning means carried along said parallel path at said constant velocity, the improvement comprising means for moving said cutting tool along a second path having an angle $a$ with respect to said axis while said tool is operated along said parallel path in order to cut said workpiece in a direction transverse to said axis, means for moving said scanning means along a last path having an angle B with respect to said axis for scanning said pattern in a direction transverse to said axis, said angles $a$ and B being chosen so that the $\tan B/\tan a$ is equal to the desired ratio between the dimension of said pattern transverse to said axis and the desired dimension of said workpiece transverse to said axis, and means for simultaneously driving said scanning means and said cutting tool along said second and last paths respectively at respective velocities the ratio of which equals $\cos a/\cos B$.

13. In an arrangement for reproducing a finished workpiece from a pattern having enlarged dimension relative said workpiece along one axis only and adapted to be traced by a sensing element for detecting the outline of said pattern, the improvement comprising a servomechanism for driving said sensing element and said tool at respective rates with said rates corresponding to the ratio between said pattern dimension along said one axis only and the dimension of said finished workpiece along the corresponding one axis.

No references cited.

WILLIAM W. DYER, Jr., *Primary Examiner.*